Aug. 16, 1927.
A. J. MICHELIN
1,639,573
VEHICLE WHEEL
Filed March 4, 1927          4 Sheets-Sheet 1
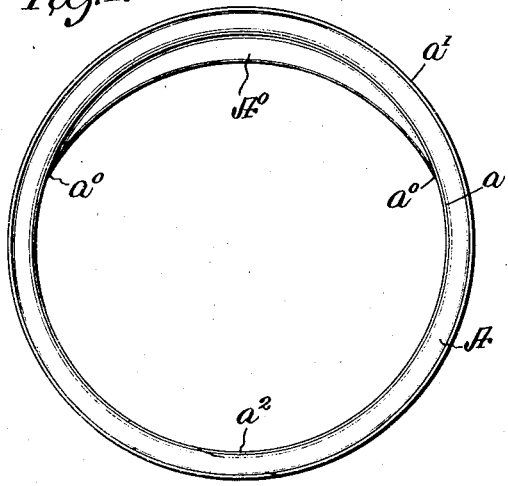
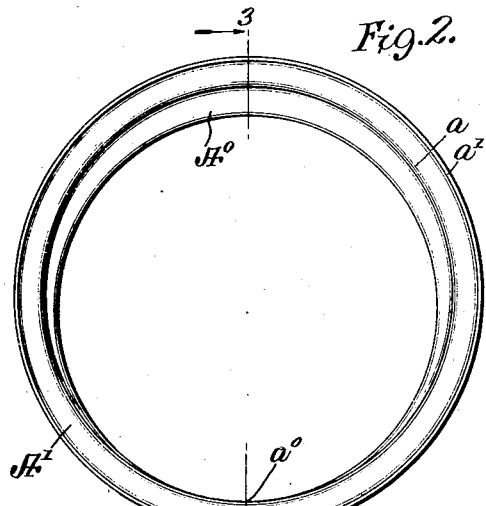
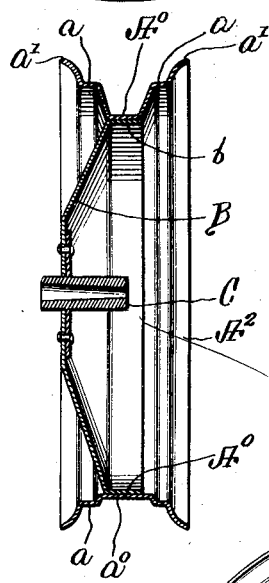
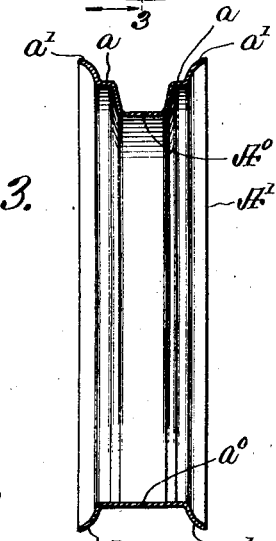
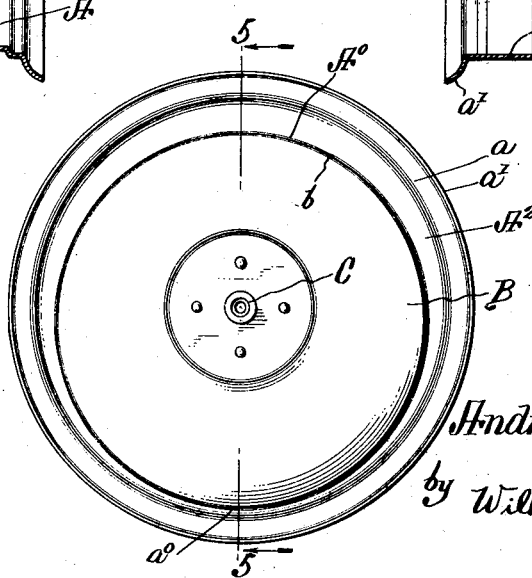
Inventor
André J. Michelin
by Wilkinson & Giusta
Attorneys.

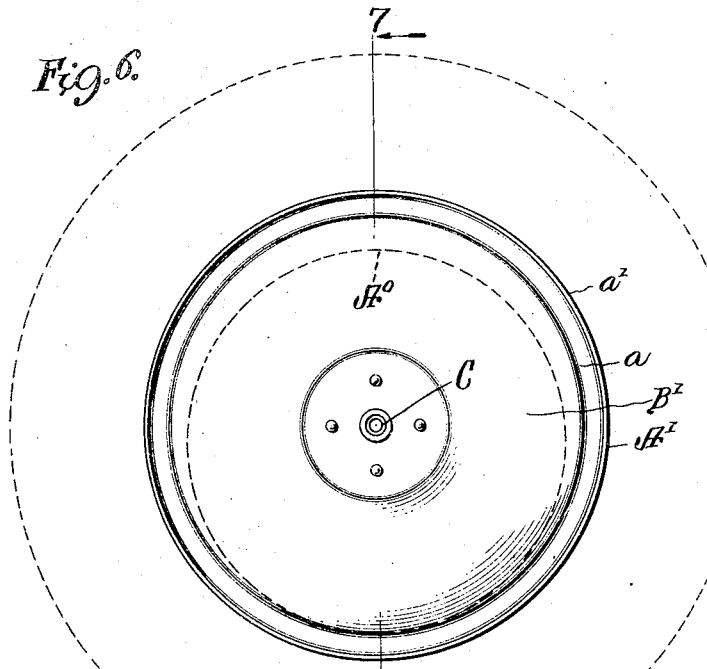
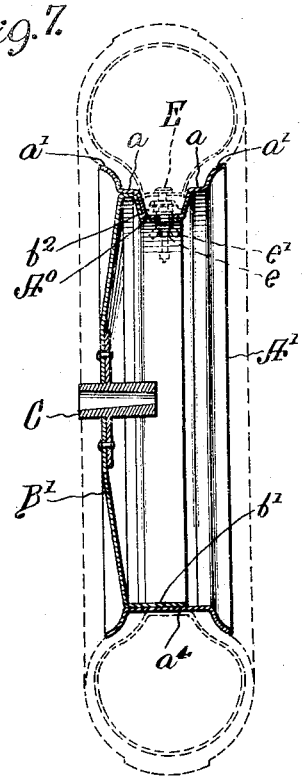
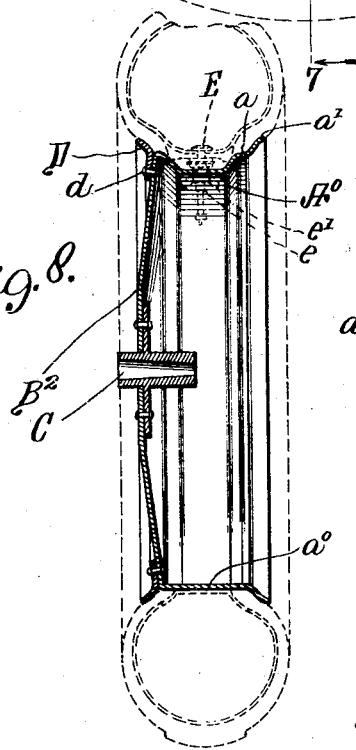
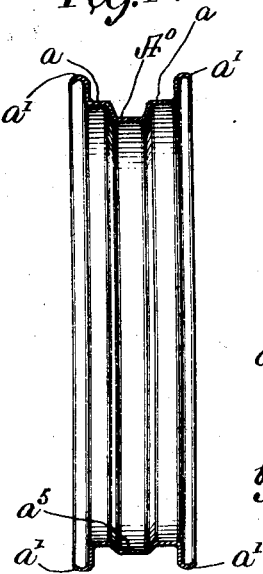
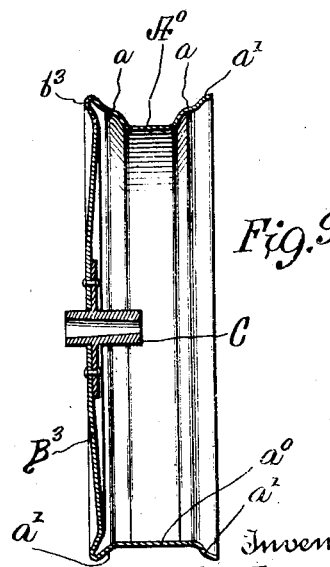

Aug. 16, 1927. 1,639,573
A. J. MICHELIN
VEHICLE WHEEL
Filed March 4, 1927   4 Sheets-Sheet 3
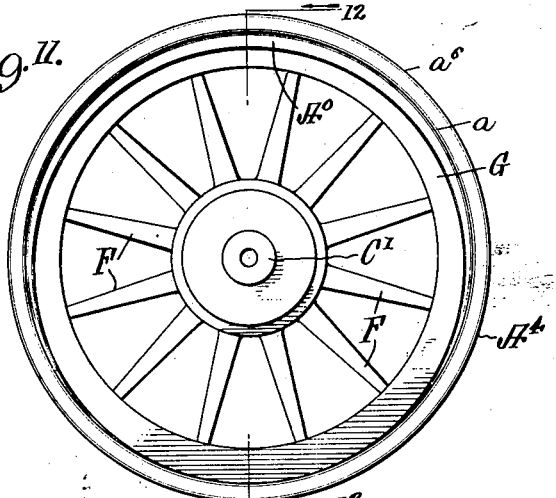
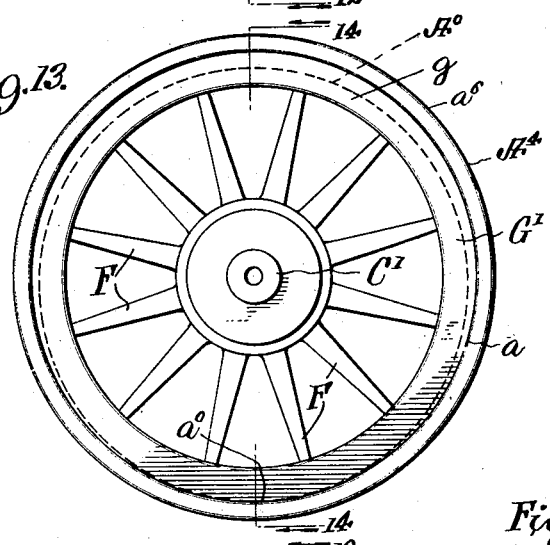
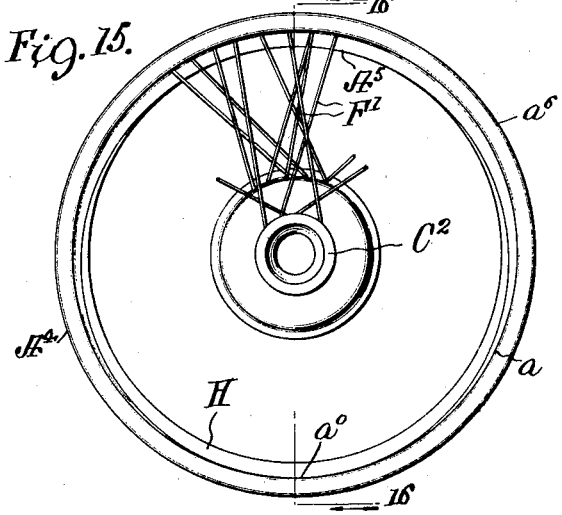
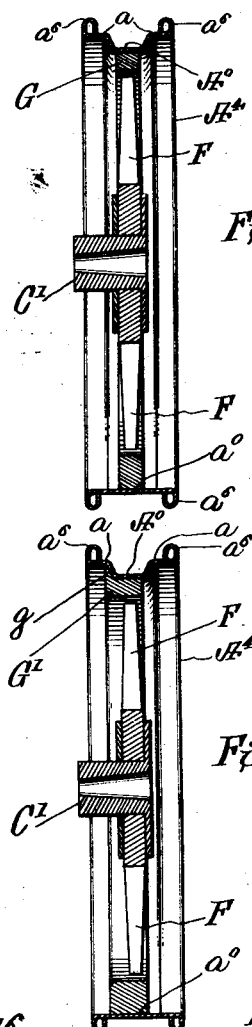
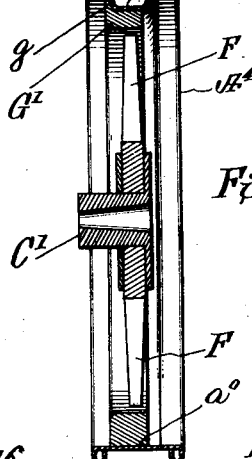
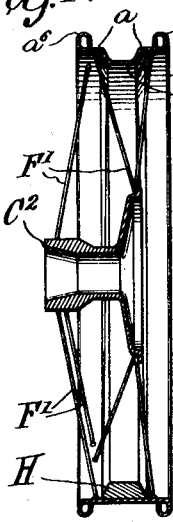
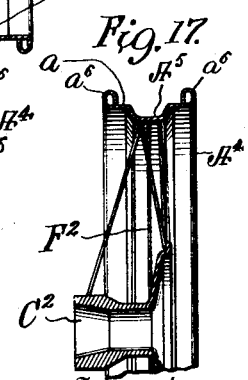
Inventor
André J. Michelin
by Wilkinson & Giusta
Attorneys

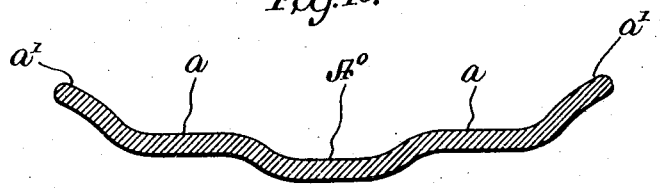
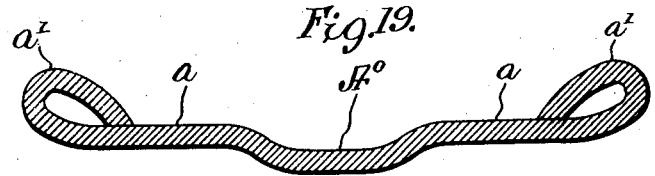
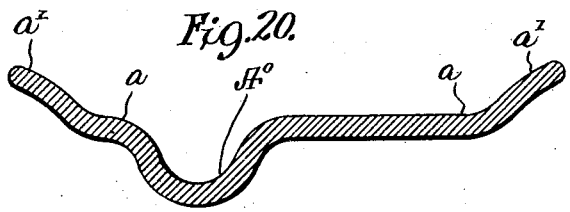
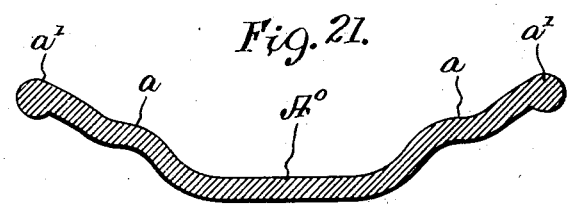
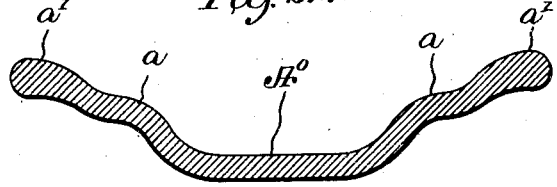
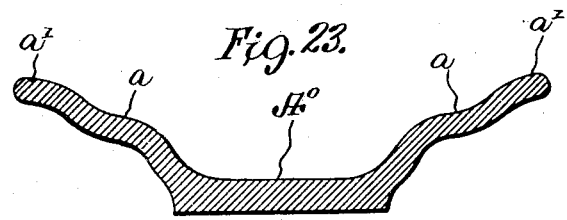
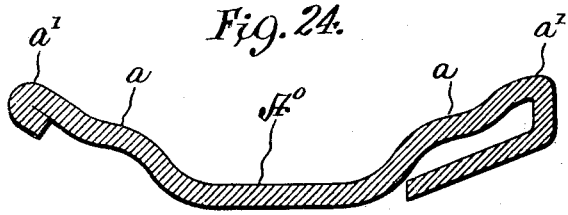

Patented Aug. 16, 1927.

1,639,573

UNITED STATES PATENT OFFICE.

ANDRÉ JULES MICHELIN, OF PARIS, FRANCE, ASSIGNOR TO MICHELIN ET CIE., OF CLERMONT-FERRAND, FRANCE, A CORPORATION OF FRANCE.

VEHICLE WHEEL.

Application filed March 4, 1927, Serial No. 172,893, and in France October 18, 1926.

In the use of pneumatic tires on vehicle wheels certain inconveniences are experienced in mounting the tire on the wheel and demounting the same, when desired; and also certain dangers are experienced from the tire working off of the rim when the vehicle is being propelled along the roadway.

Accidents from this cause occur more frequently from the perforations of the inner tube of the tires causing the tires to collapse and endangering the working of the beads over the rim.

These inconveniences and dangers were in a large measure avoided by the use of what is known as deep grooves in deep rims, or rims provided with a deep groove into which the beads of the tire may be moved when it is desired to remove the tire from the rim. At either side of this groove were annular shoulders on which the beads of the tire are normally seated when the tire is inflated.

To prevent the beads from creeping down into this groove when the tire became deflated with the resulting accidents therefrom, obstructions of various kinds are provided, such for instance as are shown in my applications, Serial No. 705,605, filed April 10, 1924, and entitled Deep rim for pneumatic tires; and Means for securing tires on rims, filed Feb. 18, 1927, Serial No. 169,368.

At first, these deep grooves extended entirely around the rim and the bottom of the groove was concentric with the circle of the bead seats, but it was found in practice more satisfactory to have the groove extend only part of the way around the rim, preferably not over 140° to 160°.

This construction satisfied the requirements of a bead receiving groove for the quick mounting and demounting of the tire casing from the rim, and at the same time increased the facility with which the obstructions to the groove might be applied or removed.

In the manufacture of the rims, however, with the deep groove extending part of the way around the circumference, parts of the rim were eccentric with the axis or hub of the wheel, and in fitting the rim to the wheel body, certain difficulties were encountered, and also certain difficulties were experienced in the proper manufacture and assembling of the parts, and it was to remedy such objections that my present invention was made.

According to my present invention, I construct a wheel body and rim adapted to be secured together in such a way that the rim will have the usual circular seats for the beads of the tire, the circles of said seats being concentric with the hub of the wheel, and the deep groove for receiving the beads in mounting or dismounting being eccentric with said circle, and I mount this rim so constructed upon a wheel body of eccentric form but adapted to fit snugly to the inner contour of the rim, the result being a wheel whose contour is apparently eccentric to the hub, but in which in reality the bead seats are concentric with the hub.

To avoid any freak appearance of such a wheel, this eccentricity is masked in any convenient way, as by the application of a segmental strip or additional piece of metal or other suitable material to the outer face of the wheel body or rim, so that to the eye the wheel will apparently have the usual symmetrical appearance, that is with all its circumferential lines circular.

My invention will be more clearly understood after reference to the accompanying drawings, in which like parts are indicated by similar reference symbols throughout the several views, and in which:

Figure 1 is a front elevation of a rim provided with the deep groove extending through a part of its circumference only, and in which the groove extends only through about 140°;

Figure 2 shows a similar rim, in which the deep groove extends through almost the entire circumference of the rim but is deepest at one side and is tangent to the circle of the bead seats at the other, the deep groove being in the form of a circle having its center eccentric to the center of the bead seats;

Figure 3 is a cross-section of Fig. 2, looking in the direction of the arrows, and shows the deep groove at one side disappearing at the other;

Figure 4 shows another form of deep groove, which extends all around the rim, but its circle is not tangent at any point to the circle of the bead seats. In this figure, the wheel body is shown as assembled with the rim and this wheel body has its axis or hub center concentric with the circle of the bead seats, but not with the circle of the deep groove;

Figure 5 shows a section along the line 5—5 of Figure 4 and looking in the direction of the arrows;

Figure 6 is a side elevation of a disc wheel carrying the rim shown in Fig. 2, with the wheel body and rim assembled and the tire shown in dotted lines;

Figure 7 shows a cross-section along the line 7—7 of Fig. 6 and looking in the direction of the arrows and further shows one means of obstructing the deep groove to prevent the admission of the beads of the tire thereinto, except when desired, such arrangement being shown in my co-pending application entitled Improvements in means for securig tires on rims, Serial No. 190,896; filed May 12, 1927;

Figure 8 is a similar section to Fig. 7, except that it shows the rim provided with the deep groove and the wheel body all made in one piece and with a segmental piece attached.

Figure 9 shows still another modified form of the invention, in which the wheel body and the rim are made in one piece and a special protruding part is provided;

Figure 10 shows a cross-section of a rim, in which the deep groove found at one side merges into a projection at the other side with the circular bead seats provided on each side of such deep groove or projection;

Figure 11 shows the eccentric rim of Fig. 2 as applied to a wooden wheel having a contour eccentric to its axis;

Figure 12 shows a section along the line 12—12 of Fig. 11 and looking in the direction of the arrows;

Figure 13 is a similar view to Fig. 11, but with the eccentric appearance of the wheel masked, as shown in cross-section in Fig. 14;

Figure 14 shows a section along the line 14—14 of Fig. 13, and looking in the direction of the arrows;

Figure 15 is a diagrammatic view showing an eccentric rim as applied to a wire wheel, with the masking piece added to mask the eccentricity of the wheel;

Figure 16 shows a section along the line 16—16 of Figure 15 and looking in the direction of the arrows;

Figure 17 shows a form of wire wheel having straight spokes but provided with a deep groove rim of the character hereinbefore described; and Figures 18, 19, 20, 21, 22, 23 and 24 represent cross-sections of different forms of rims adapted for use in connection with my present invention, these rims being arranged to provide deep grooves and made to prevent the pinching or cutting of the tire as it is compressed under loads as explained in my application Serial No. 68,418, filed November 11, 1925, and entitled Improvements in vehicle rim and tire.

Referring first to Fig. 1, A represents a rim, which is provided with the usual bead seats $a$ and with the outer flanges $a'$, the bead seats being always circular in contour and the retaining flanges being also preferably circular but not necessarily so. Projecting inside of the rim is a deep groove portion $A^0$, whose bottom merges as at $a^0$ into the bottom of the channel $a^2$ in which the beads are seated. In Fig. 1, the bottom of the groove $A^0$ is in the form of an arc of a circle, which intersects the circle of the bead seats and this arc of a circle extends only through about 140° of the circumference.

In Figs. 2 and 3, I have shown a similar rim $A'$ having the circular bead seats $a$ as before and with the circular retaining flanges $a'$, but the deep groove $A^0$ has its bottom in the form of a circle tangent at $a^0$ to the circle of the bead seats, or in other words, the bottom of the groove and the bottom of the channel in which the beads are seated merge at the point $a^0$.

In Figs. 4 and 5, I have shown a similar rim $A^2$ having the circular bead seats $a$ and circular retaining flanges $a'$ as before, but the circle of the bottom of the deep groove does not contact or intersect the circle of the bead seats, the said groove being deeper at one side than at the other, as shown most clearly in Fig. 5, and the beads would rest on the seats $a$ at either side of this groove.

In this figure, this rim is shown as mounted on a disc wheel B, provided with a circular flange $b$ eccentric with the hub $c$.

By having the wheel body made circular in contour and the inside of the rim also circular in contour, the two may be very readily made to fit together and assembled when desired, and it is a simple matter to arrange the hub so that it shall be eccentric to the wheel body, but concentric with the bead seats. Thus, the mechanical difficulties that would be experienced in making a wheel body of such a shape as to fit the rim of Fig. 1 would be avoided, whereas it would be a simple matter to shape the contour of a wheel body to fit the rim shown in Figs. 2, 3, 4, and 5.

It is well known that masses of metal may be shaped mechanically with cylindrical surfaces adapted to fit each other, whereas when these surfaces are irregular, such fitting is difficult and sometimes mechanically impracticable.

In Figs. 6 and 7, I have shown a tire mounted on the rim of a disc wheel, in which the wheel body B' is provided with a cylindrical flange at one side $b'$ and is shaped at the other side $b^2$ to fit the side and bottom of the rim. In this case, the rim is provided at its sides with the usual retaining flanges $a'$ and with the usual bead seats $a$, which merge at the other side of the rim into the channel $a^4$.

In this form of device, the hub C of the wheel is also concentric with the bead seats.

In the modification shown in section in Fig. 8, the wheel body $B^2$ is shown as integral with the rim, and one of the retaining flanges $a'$ is circular as before, while a supplemental or segmental flange piece or ring D is secured to the wheel body as at $d$. In this and all other cases, the hub C is concentric with the bead seats.

In Figs. 7 and 8, I have shown means for obstructing the groove in the rim to prevent the entrance of the beads of the tire therein, comprising a bridge piece E and bolt $e$ and adjusting nut $e'$, all as shown in my application filed May 12, 1927, Serial No. 190,896 and entitled Means for securing tires on rims, but other means for preventing the entrance of the beads into the groove of the rim, when not desired, may be provided, and I do not mean to limit this invention to any particular means for obstructing the groove in the tire.

In Fig. 9, I have shown a similar view to Fig. 8, except that the wheel body $B^3$ is made integral with the rim and that slightly different shapes of bead seats $a$ and retaining flanges $a'$ are provided, and in which also the piece D of Fig. 8 is replaced by a shaped portion $b^3$ of the combined wheel body and rim.

In Fig. 10, I have shown in cross-section a rim, in which the circle of the bottom of the deep groove $A^0$ intersects the circle of the bead seats, leaving the groove at one side and a rib $a^5$ at the other. At either side of this groove or rib the circular bead seats $a$ are provided with the usual retaining flanges $a'$.

In Figs. 11 and 12, I have shown a rim $A^4$ having a circular inner diameter applied to the felly of a wooden wheel. In these figures, the hub C' of the wheel is connected by the spokes F to the felly G. The contour of this felly is eccentric with the hub, the felly being thicker at one side of the hub than at the other, as shown in Fig. 12, but the contour of the felly is circular and fits in the circular bottom of the rim, to which it is secured in any convenient way.

In this form of rim, I have shown the groove $A^0$ similar in construction to that of Figs. 2 and 3, with the usual circular bead seats $a$ and with the flanges bent over as shown at $a^6$. It will be obvious that the wheel shown in Figs. 11 and 12 would appear to the eye to be eccentric, and to avoid any freakish aspect any suitable masking arrangement might be employed, such for instance, as providing the outwardly projecting portion $g$ of the felly G', as shown at the top of Fig. 14.

The construction shown in Figs. 13 and 14 is otherwise similar to that shown in Figs. 11 and 12.

In Figs. 15 and 16, I have shown in side elevation and in section a wheel having the wire spokes connecting the hub $C^2$ and the rim $A^5$. These spokes F' may be secured on the interior of the rim, preferably beneath the bead seats by welding or in any other convenient way. The hub is concentric with the bead seats $a$ of the rim $A^4$, which is similar in other respects to the rim shown in Figs. 12 and 14. Since this wheel would apparently have an eccentric appearance if seen from the side, a segmental filling piece H preferably of hollow sheet metal may be applied to the rim between the spokes, as shown in cross-section in Fig. 16 and in front elevation in Fig. 15.

In Figure 17, I have shown the spokes $F^2$ as connecting the hub C and the bottom of the groove $A^0$ to the rim $A^4$, but any convenient mode of attaching the spokes to the rim may be adopted and I do not mean to limit the invention to any particular detail of such construction.

In Figs. 18 to 24 I have shown rims of different cross-sections, which might be used in connection with my invention, and in these figures no sharp angle or shoulder engages the tire when it is compressed owing to the load thereon or obstruction encountered on the road. In some of these figures, as in Figs. 19, 21, 22 and 24, the edges of the rim are reinforced or stiffened.

The advantages of these constructions are brought out in detail in my application Serial No. 68,418, filed November 11, 1925 and entitled Improvements in vehicle rim and tire.

Thus, it will be seen that I do not mean to limit the invention to any particular cross-section or profile of the rim or to disc wheels, but the invention is applicable alike to various forms of rim provided with a deep groove therein and to wheels of various constructions, whether disc wheels, wooden wheels, or metal wheels with wire spokes, or whether the wheels be used singly or mounted in pairs on the hub, as well known in the art.

It will be obvious that various changes might be made in the construction, combination and arrangement of parts, which could be used without departing from the spirit of my invention, and I do not mean to limit the invention to such details, except as particularly pointed out in the claims.

Having thus described my invention, what I claim and desire to secure by Letters Patent of the United States is:

1. The combination with a wheel body provided with a hub and having a contour eccentric to said hub, of a rim having an inner contour adapted to engage the contour of the wheel body, said rim having annular tire receiving shoulders, concentric with the hub when mounted on the wheel body, said rim being also provided with an inwardly projecting bead receiving groove located between said shoulders and extending only through part of the circumference of said rim.

2. The combination with a wheel body provided with a hub and having a contour eccentric to said hub, of a rim having an inner contour adapted to engage the contour of the wheel body, said rim having annular tire receiving shoulders, concentric with the hub when mounted on the wheel body, said rim being also provided with an inwardly projecting bead receiving groove located between said shoulders and extending only through part of the circumference of said rim, with means for masking the eccentricity of said wheel body and rim.

3. The combination with a wheel body provided with a hub and having a contour eccentric to said hub, of a rim having an inner contour adapted to engage the contour of the wheel body, said rim having annular tire receiving shoulders, concentric with the hub when mounted on the wheel body, said rim being also provided with an inwardly projecting bead receiving groove located between said shoulders.

4. In a vehicle wheel adapted for use with pneumatic tires provided with beads, the combination with a wheel body provided with a hub and having a contour eccentric to said hub, of a rim having an inner contour adapted to engage the contour of the wheel body, said rim having annular shoulders forming seats for said beads, when the tire is inflated, said shoulders being concentric with the hub when mounted on the wheel body, said rim being also provided with an inwardly projecting bead receiving groove located between said shoulders and extending only through part of the circumference of said rim.

5. In a vehicle wheel adapted for use with pneumatic tires provided with beads, the combination with a wheel body provided with a hub and having a contour eccentric to said hub, of a rim having an inner contour adapted to engage the contour of the wheel body, said rim having annular shoulders forming seats for said beads, when the tire is inflated, said shoulders being concentric with the hub when mounted on the wheel body, said rim being also provided with an inwardly projecting bead receiving groove located between said shoulders and extending only through part of the circumference of said rim, with means for masking the eccentricity of said wheel body and rim.

6. The combination with a wheel body provided with a hub and having an outer circular contour eccentric to said hub, of a rim having an inner circular contour adapted to engage the contour of the wheel body, said rim having annular tire receiving shoulders, concentric with the hub when mounted on the wheel body, said rim being also provided with an inwardly projecting bead receiving groove located between said shoulders.

7. In a vehicle wheel adapted for use with pneumatic tires provided with beads, the combination with a wheel body provided with a hub and having an outer circular contour eccentric to said hub, of a rim having an inner circular contour adapted to engage the contour of the wheel body, said rim having annular shoulders forming seats for said beads, when the tire is inflated, said shoulders being concentric with the hub when mounted on the wheel body, said rim being also provided with an inwardly projecting bead receiving groove located between said shoulders and extending only through part of the circumference of the said rim.

8. In a vehicle wheel adapted for use with pneumatic tires provided with beads, the combination with a wheel body provided with a hub and having an outer circular contour eccentric to said hub, of a rim having an inner circular contour adapted to engage the contour of the wheel body, said rim having annular shoulders forming seats for said beads, when the tire is inflated, said shoulders being concentric with the hub when mounted on the wheel body, said rim being also provided with an inwardly projecting bead receiving groove located between said shoulders and extending only through part of the circumference of said rim, with means for masking the eccentricity of said wheel body and rim.

9. A metal rim for tires comprising a channeled annulus having circular seats to engage the beads of the tire when the tire is inflated and having its inner circumference in the form of a ring eccentric to the circle of the bead seats, but adapted to engage the circular contour of a wheel body.

10. In a vehicle wheel, a metal rim for tires comprising a channeled annulus having circular seats to engage the beads of the tire when the tire is inflated and having its inner circumference in the form of a ring eccentric to the circle of the bead seats, but adapted to engage the circular contour of a wheel body, with means for masking the eccentricity of said rim.

11. In a vehicle wheel, a metal rim for tires, comprising a channeled annulus having circular seats to engage the beads of the tire when the tire is inflated and having its inner circumference in the form of a ring eccentric to the circle of the bead seats, but adapted to engage the circular contour of a wheel body, with means for masking the eccentricity of said rim, said means comprising a segmental filling piece having its inner edge concentric with the circle of the bead seats.

ANDRÉ JULES MICHELIN.